United States Patent
Koshi et al.

(10) Patent No.: US 6,510,978 B1
(45) Date of Patent: *Jan. 28, 2003

(54) SOLDER JET MACHINE AND SOLDERING METHOD

(75) Inventors: Masuo Koshi, Ikoma (JP); Kenichirou Todoroki, Hirakata (JP); Tadahiko Sugimoto, Kadoma (JP)

(73) Assignee: Matsushita Electric Industrial Co., Ltd. (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/702,055

(22) Filed: Oct. 31, 2000

(30) Foreign Application Priority Data

Nov. 1, 1999 (JP) .............................. 11-310458
Aug. 23, 2000 (JP) ........................... 2000-251727

(51) Int. Cl.⁷ .............................. H05K 3/34; B23K 3/06
(52) U.S. Cl. .......................... 228/256; 228/37; 228/260
(58) Field of Search .......................... 228/37, 260, 257, 228/258, 259, 261, 262, 33, 56.1, 56.2, 256

(56) References Cited

U.S. PATENT DOCUMENTS 4,995,411 A * 2/1991 Lowell et al. .............. 134/198
5,622,303 A * 4/1997 Worthmann .................. 228/37
6,257,482 B1 * 7/2001 Koshi et al. ................. 228/260
6,273,319 B1 * 8/2001 Ichikawa et al. ............ 228/102

FOREIGN PATENT DOCUMENTS

| JP | 58-218368 | * 12/1983 |
| JP | 1-157764 | * 6/1989 |
| JP | 3-118963 | * 5/1991 |
| JP | 8-46347 | * 2/1996 |
| JP | 8-335773 | * 12/1996 |
| JP | 11-340621 | * 12/1999 |

* cited by examiner

Primary Examiner—M. Alexandra Elve
Assistant Examiner—Len Tran
(74) Attorney, Agent, or Firm—Parkhurst & Wendel, L.L.P.

(57) ABSTRACT

To provide a solder jet machine with which a molten solder wave with stable height can be obtained. A satisfactory and stable molten solder wave is obtained by forming wall portions surrounding solder ejecting ports, which are arranged in a first, a second and a third ejecting-port rows on a solder wave forming plate, in such a manner that they are allowed to project upwardly, in addition, by forming groove portions, which are for introducing the ejected solder in such a direction as to be allowed to flow down, around the above-described solder ejecting ports, so that the molten solder ejected from the solder ejecting ports in the third row and the second row can flow down rapidly between adjacent solder ejecting ports in the first row without disturbing any wave of the molten solder ejected from the first row.

4 Claims, 11 Drawing Sheets

FIRST EJECTING PORT ROW
SECOND EJECTING PORT ROW
THIRD EJECTING PORT ROW

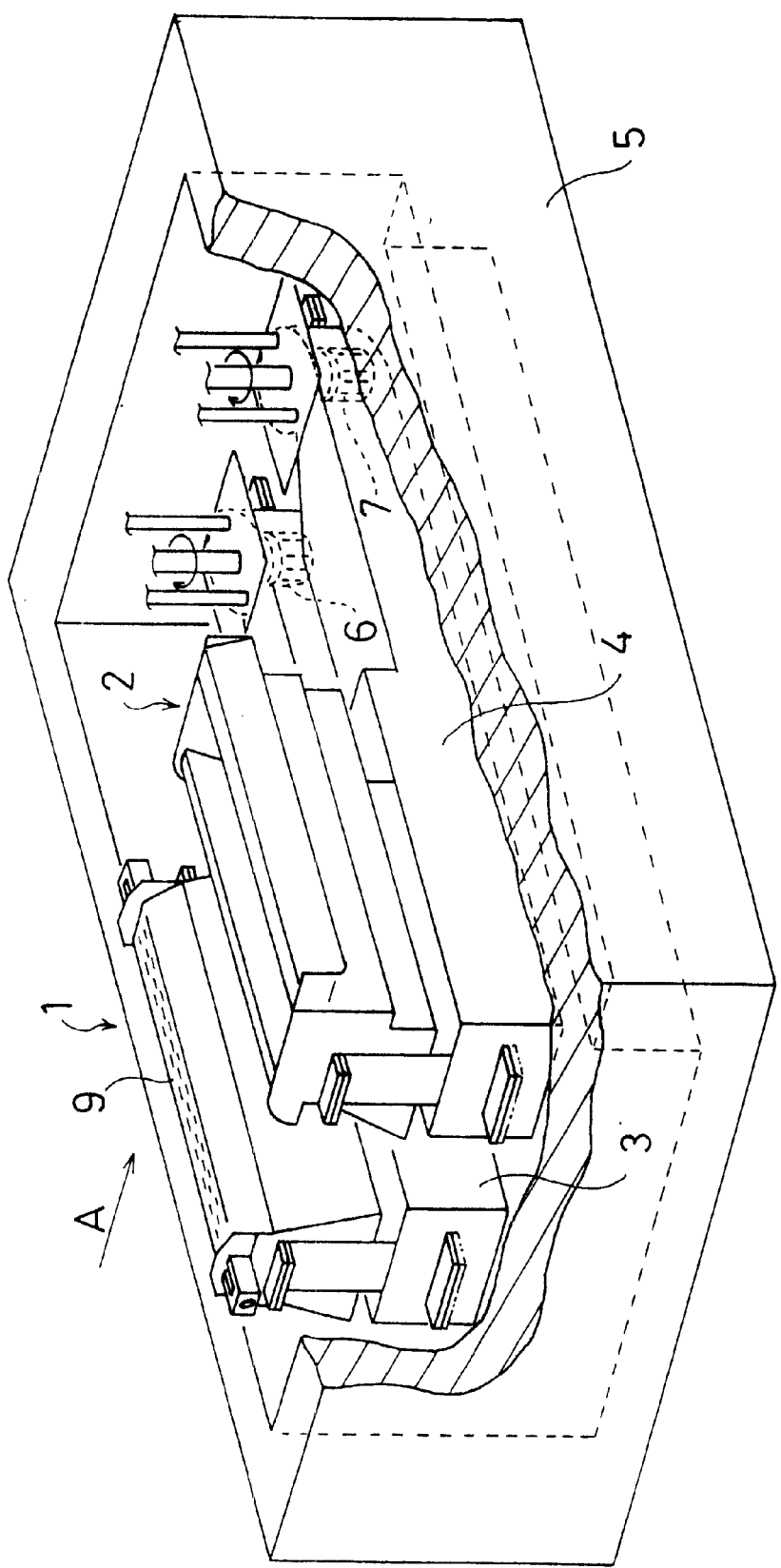

SOLDER JET MACHINE AND SOLDERING METHOD

FIELD OF THE INVENTION

The present invention relates to a solder jet machine for soldering electronic parts already mounted on a substrate with their leads inserted thereinto by receiving a substrate subject to soldering carried in from its substrate-carrying-in side and ejecting molten solder from its solder ejecting ports to the pattern side of the substrate subject to soldering while conveying the substrate subject to soldering keeping a pattern side facing down and to a method of soldering used in the above machine.

BACKGROUND OF THE INVENTION

Solder jet machines are already known for soldering surface mount devices and discrete parts (parts having lead legs) mounted on a substrate in a mixed state by supplying the substrate subject to soldering with molten solder ejected from their jet nozzles while conveying the substrate subject to soldering.

Solder jet machines of this type includes a first jet nozzle 1 for satisfactorily supplying molten solder to a substrate P subject to soldering on which electronic parts have been mounted and a second jet nozzle 2 for removing excess molten solder from the substrate P subject to soldering to which solder has been already supplied, as shown in FIGS. 7 and 8.

In the above solder jet machine, the first jet nozzle 1 and the second jet nozzle 2 are connected to a duct 3 for the first nozzle and a duct 4 for the second nozzle, respectively, and both of the ducts are soaked in a solder bath 5 in which molten solder is stored.

This solder jet machine is configured by ejecting molten solder from the first jet nozzle 1 and the second jet nozzle 2 toward a path 10 for conveying a substrate subject to soldering by rotationally driving jet impellers 6 and 7 arranged to face each of the openings at one end of the duct 3 and at one end of the duct 4, respectively.

On the upper end portion of the first jet nozzle 1 mounted is a solder wave forming plate 9 having multiple solder ejecting ports 8 provided thereon. As shown in FIGS. 9a and 9b, the ejecting ports 8 are designed to have the same bore diameter and the same round shape and they form three rows relative to a direction A in which the substrate P subject to soldering is conveyed: a first ejecting-port row 8A, a second ejecting-port row 8B and a third ejecting-port row 8C. In this solder jet machine, the wall portion surrounding each solder ejecting port 8 on the solder wave forming plate 9 is flat.

The substrate P subject to soldering have warps of various sizes caused therein when it is heated by molten solder. And in the solder jet machine of the prior art which has the above-described configuration, when the height of the pile of the molten solder ejected from the solder ejecting ports 8A is low, there are produced some places in the pattern side of the substrate P subject to soldering and in the portions of electronic parts subject to soldering which molten solder does not touch, which means causing non-wetting.

As one of the prior art methods to deal with the problem of non-wetting, it is possible to heighten the pile of the molten solder by increasing the rpm of the jet impellers 6 and 7. However, at the time of increasing the rpm of the jet impellers 6 and 7, the average height of the pile of the molten solder over a time is increased, but on the other hand, the height varies with time and is likely to be unstable. And when the height of the pile of the molten solder ejected from the solder ejecting ports 8 becomes low temporarily, there may be produced some places in the pattern side of the substrate P subject to soldering and in the portions of electronic parts subject to soldering which the molten solder does not touch, which means causing non-wetting in some parts.

Alternatively, it is possible to provide a configuration which enables heightening the pile of the molten solder without increasing the rpm of the jet impellers 6 and 7 by forming each solder ejecting port 8 on the solder wave forming plate 9 in such a manner as to be allowed to project from the surface of the solder wave forming plate 9 by coining, as shown in FIGS. 10 and 11.

However, although the pile of the molten solder can be heightened without increasing the rpm of the jet impellers 6 and 7, there still arises a problem that a satisfactorily stable height of molten solder wave cannot be obtained only by forming each solder ejecting port 8 in such a manner as to be allowed to project upwardly. Specifically, the wave of the molten solder ejected from the first ejecting-port row 8A is disturbed by the molten solder ejected from the third and the second ejecting-port rows 8C and 8B and becomes unstable, which causes the soldering defect that permits the molten solder to run onto the component side of the substrate P subject to soldering which has been carried in the solder jet machine.

SUMMARY OF THE INVENTION

Accordingly, the object of the present invention is to provide a solder jet machine and a method for soldering which enable obtaining a molten solder wave of stable height.

In order to attain the above object, the solder jet machines according to the present invention is characterized by: forming a wall portion surrounding each solder ejecting port in such a manner as to be allowed to project upwardly from the surface of the solder wave forming plate; and forming a groove portion on the surface of the solder wave forming plate around each solder ejecting port for introducing the ejected molten solder in such a direction as to be allowed to flow down.

And the method of soldering according to the present invention is characterized by: forming a wall portion surrounding each of the solder ejecting ports formed in multiple rows relative to the direction in which a substrate subject to soldering is conveyed, in such a manner as to be allowed to project upwardly from the surface of the solder wave forming plate; forming a stable solder wave by allowing the molten solder ejected from the solder ejecting ports on the downstream side relative to the substrate-conveying direction to flow down between the adjacent solder ejecting ports on the upstream side relative to the substrate-conveying direction and by introducing the molten solder ejected from the above solder ejecting ports in such a direction as to be allowed to flow down via groove portions formed around the above solder ejecting ports; and soldering the substrate subject to soldering using the above wave.

A solder jet machine according to the first aspect of the invention as set forth in claims is characterized by: forming the above-described solder ejecting ports in multiple rows relative to the direction in which the substrate subject to soldering is conveyed; forming the above-described solder ejecting ports in such a manner that an imaginary line which links a solder ejecting port in the row on the upstream side relative to the substrate-conveying direction and a solder ejecting port in the row on the downstream side relative to the substrate-conveying direction is sloped so that the molten solder ejected from the solder ejecting ports on the upstream side can flow down between the adjacent solder ejecting ports on the upstream side; and forming groove portions on the surface of the solder wave forming plate around at least part of the above-described solder ejecting ports for introducing the ejected molten solder in such a direction as to be allowed to flow down.

A solder jet machine according to the second aspect of the invention is characterized by: forming solder ejecting ports on the solder wave forming plate in three rows: a first electing-port row, a second electing-port row and a third ejecting-port row, in this order, from the upstream side to the downstream side relative to the direction in which a substrate subject to soldering is conveyed; configuring the solder ejecting ports and the solder wave forming plate in such a manner that at least part of the molten solder ejected from the solder ejecting ports in the third row flows down between the adjacent solder ejecting ports in the second ejecting-port row and between the adjacent solder ejecting ports in the first ejecting-port row; and forming groove portions around the solder ejecting ports in the second ejecting-port row for introducing the molten solder ejected from the solder ejecting ports in both the second and the third ejecting-port rows between the adjacent solder ejecting ports in the first electing-port row.

A solder jet machine according to the third aspect of the invention is characterized by: forming solder ejecting ports on the solder wave forming plate in three rows: a first electing-port row, a second electing-port row and a third ejecting-port row, in this order, from the upstream side to the downstream side relative to the direction in which a substrate subject to soldering is conveyed; forming groove portions around the solder ejecting ports in the first, the second and the third ejecting-port rows; and forming groove portions from the groove portions around the solder ejecting ports in the first ejecting-port row toward the upstream side on the solder wave forming plate relative to the direction in which the substrate subject to soldering is conveyed, and linking the groove portions 33 to each other.

In the above-described solder jet machines, the wall portion surrounding each solder ejecting port on the solder wave forming plate is allowed to project upwardly and the groove portions for introducing the ejected molten solder in such a direction as to be allowed to flow down are formed on the surface of the solder wave forming plate around at least part of the above-described solder ejecting ports; therefore, according to the solder jet machines, it is possible to heighten the pile of the molten solder without increasing the rpm of the jet impellers, to obtain molten solder waves of satisfactorily high from the solder ejecting ports projecting from the surface of the solder wave forming plate, and hence to realize a satisfactory soldering performance.

The method of soldering as set forth in claims carries out soldering in such a manner as to supply molten solder to a substrate subject to soldering by ejecting the molten solder from multiple solder ejecting ports formed on a solder wave forming plate during the conveyance of the substrate subject to soldering, characterized by: forming a wall portion surrounding each of the above-described solder ejecting ports formed in multiple rows relative to the direction in which the substrate subject to soldering is conveyed in such a manner as to be allowed to project upwardly from the surface of the solder wave forming plate; arranging the solder ejecting ports in such a manner that an imaginary line linking a solder ejecting port in the row on the upstream side and a solder ejecting port in the row on the downstream side is sloped upward in the direction in which the substrate subject to soldering is conveyed, so that the molten solder ejected from the solder ejecting ports on the downstream side can flow down between the adjacent solder ejecting ports on the upstream side; promptly introducing the molten solder ejected from the above-described solder ejecting ports in such a direction as to be allowed to flow down via the groove portions formed around at least part of the above-described solder ejecting ports so as to stabilize the solder wave; and soldering the substrate subject to soldering using the solder wave ejected from the above-described multiple solder ejecting ports.

According to this soldering method, the wall portion surrounding each of the solder ejecting ports formed in multiple rows relative to the direction in which a substrate subject to soldering is conveyed is formed in such a manner as to be allowed to project upwardly from the surface of the solder wave forming plate, the molten solder ejected from the solder ejecting ports on the downstream side is allowed to flow down between the adjacent solder ejecting ports on the upstream side, and the molten solder ejected from the above-described solder ejecting ports is promptly introduced in such a direction as to be allowed to flow down via the groove portions formed around the above-described solder ejecting ports so that solder waves of high stability and large height can be formed; thus, with these solder waves, it becomes possible to solder the substrate subject to soldering satisfactorily.

BRIEF DESCRIPTION OF THE DRAWINGS

FIG. 7 is a schematic perspective view of an entire solder jet machine;

DESCRIPTION OF THE EMBODIMENTS

The embodiments of the present invention will be described below with reference to FIGS. 1 to 6.

In the description below, the basic structures of the present invention will be described with reference to FIGS. 5a, 5b and FIGS. 6a, 6b in which each wall surrounding each solder ejecting port is formed in such a manner as to be allowed to project upwardly from the surface of a solder wave forming plate and the concrete shape of the main part of each basic structure will be described with reference to FIGS. 1 to 3.

Figure 5A:
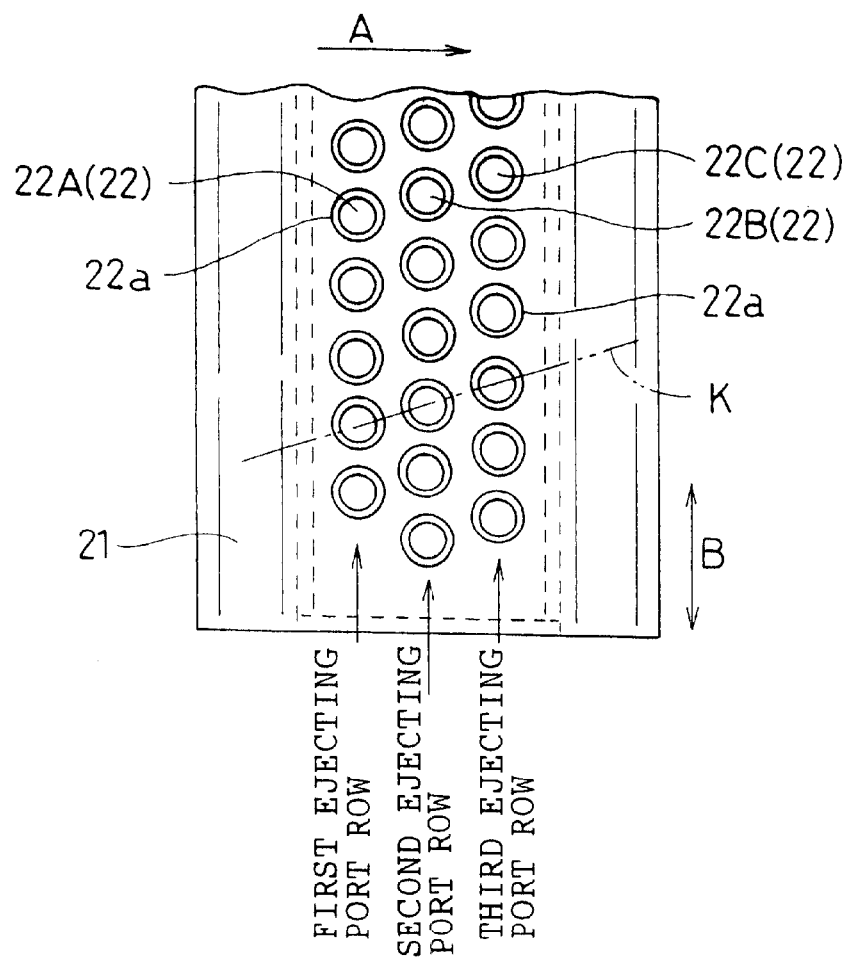
FIGS. 5*a* and 5*b* are a top view and a front view, respectively, showing a main part of a basic configuration of a solder jet machine embodying the present invention.
Figure 5B:
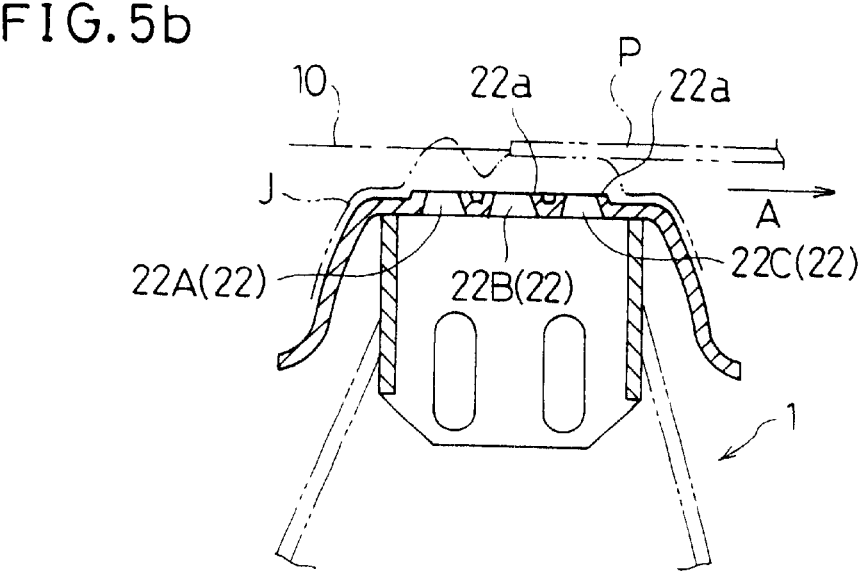

Referring to FIGS. 5a and 5b, there is shown a first basic configuration of the present invention. The details of the main part will be described with reference to FIGS. 1 to 3, as described above.

A solder wave forming plate 21 mounted on the upper end portion of a first solder jet nozzle 1 has multiple solder ejecting ports 22 formed thereon. A substrate P subject to soldering has discrete parts mounted thereon and has only relatively small irregular portions (not shown in the drawings). A direction A in which the substrate P subject to soldering is conveyed is almost horizontal; and corresponding to this, the solder wave forming plate 21 mounted on the upper end portion of the first solder jet nozzle 1 of the solder jet machine is installed in such a manner that its section provided with the solder ejecting ports 22 is almost horizontal to the direction A in which the substrate is conveyed.

These solder ejecting ports 22, all of which are given the same bore diameter and the same round shape, are formed on the solder wave forming plate 21 in three rows: a first ejecting-port row 22A, a second ejecting-port row 22B and a third ejecting-port row 22C in this order from the upper side to the down side relative to the direction A in which the substrate P subject to soldering is conveyed, and they are staggered in the direction B perpendicular to the direction A in which the substrate P subject to soldering is conveyed.

And each wall portion 22a surrounding each of the solder ejecting ports 22 on the solder wave forming plate 21 is formed in such a manner as to be allowed to project upwardly by, for example, coining.

In accordance with the above configuration, since each wall portion 22a surrounding each solder ejecting port 22 is allowed to project upwardly, the molten solder introduced into the solder jet nozzle under the solder wave forming plate 21 is guided more properly by each projecting wall portion 22a surrounding each solder jet port 22, thereby the molten solder ejected from the solder ejecting ports 22 can be piled up to a desired height, and moreover, such a state can be maintained stably and satisfactorily. Thus, even if there occurs a little fluctuation in location on the pattern side of the substrate P subject to soldering or on the portions of the electronic parts subject to soldering, molten solder touches the pattern side of the substrate P subject to soldering or the portions of the electronic parts subject to soldering satisfactorily, which enables the prevention of non-wetting, and hence the improvement in reliability of the products.

Figure 6A:
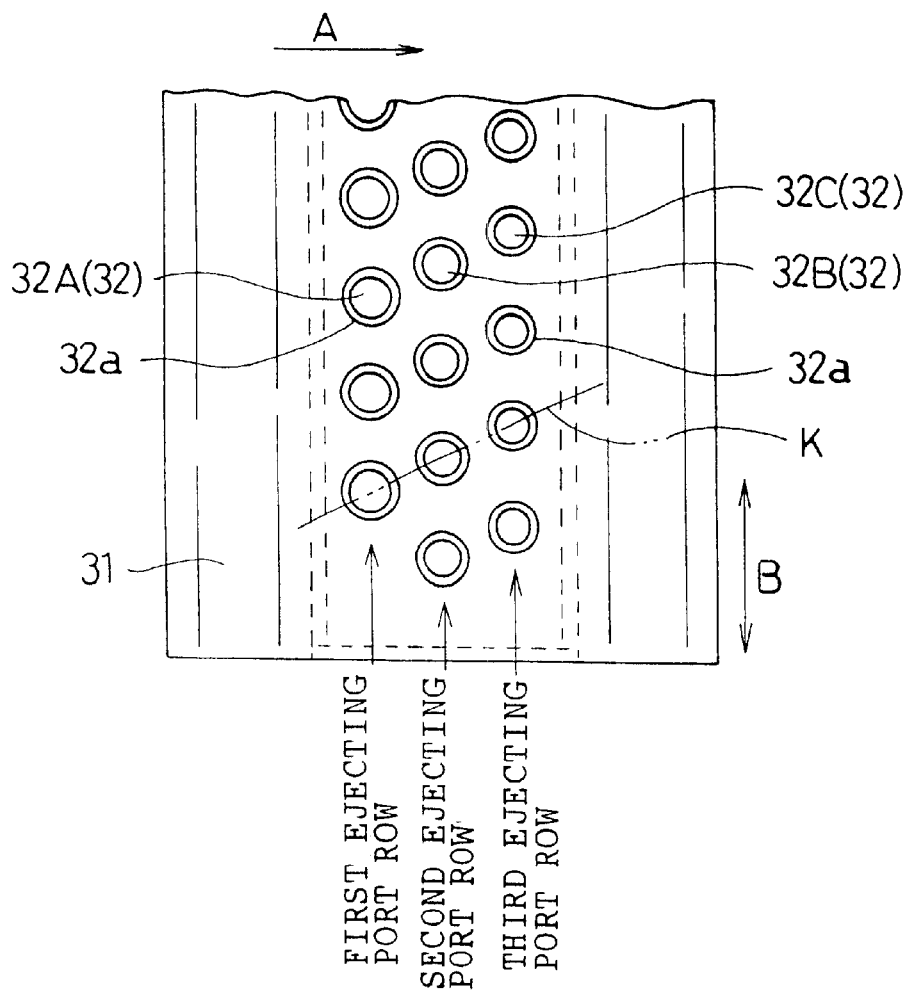
FIGS. 6*a* and 6*b* are a top view and a front view, respectively, showing a main part of another basic configuration of a solder jet machine embodying the present invention.
Figure 6B:
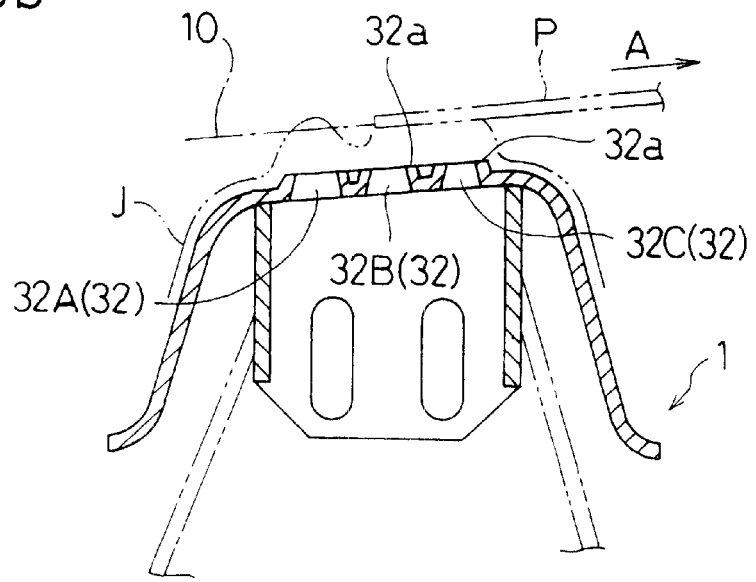
Figure 8:
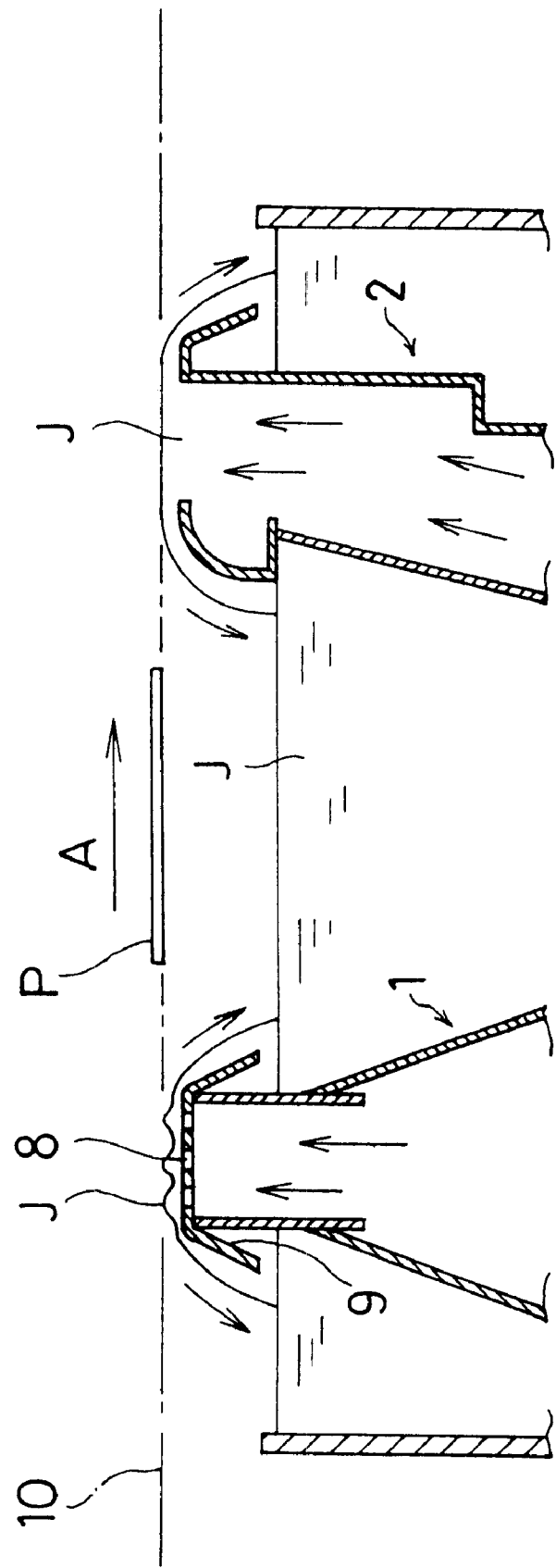
FIG. 8 is a schematic front view in section of a solder jet machine.
Figure 9A:
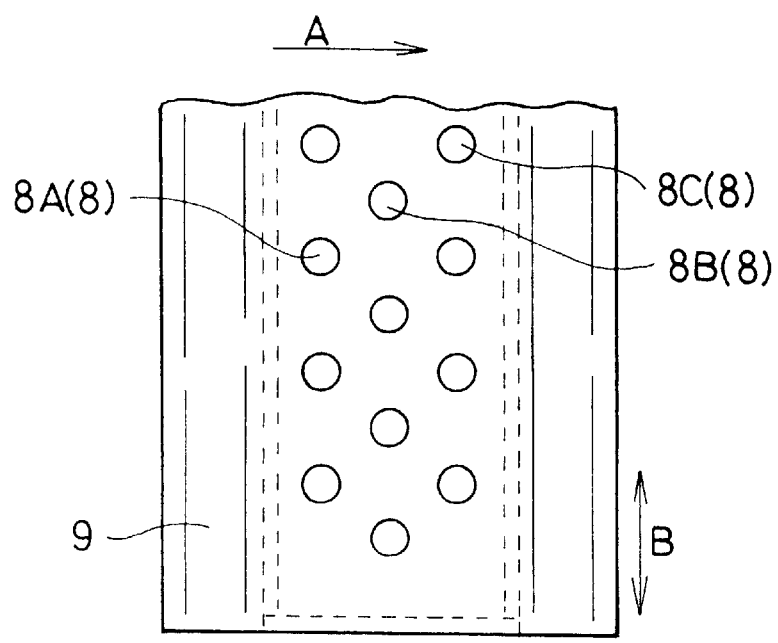
FIGS. 9*a* and 9*b* are a top view and a front view, respectively, showing a main part of a solder jet machine according to the prior art.
Figure 9B:
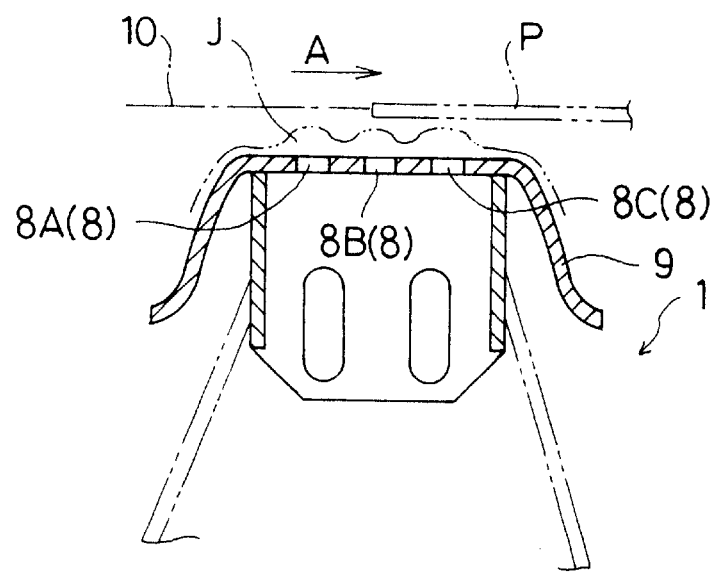

Referring to FIGS. 6a and 6b, there is shown a second basic configuration of a solder jet machine according to the present invention. The details of its main part will be described with reference to FIGS. 1 to 3, as described above.

In this second basic configuration, the substrate P subject to soldering has discrete parts and surface mount devices mounted thereon in a mixed state and has relatively large irregular portions on its pattern side. And in order to satisfactorily solder such a substrate P as has relatively large irregular portions on its pattern side, the direction A in which the substrate P subject to soldering is conveyed and the section of the solder wave forming plate 31 at which solder ejecting ports 32 are formed are sloped in such a manner that they go up toward the downstream side of the direction A in which the substrate P subject to soldering is conveyed.

The solder ejecting ports 32 are formed on the solder wave forming plate 31 in three rows: a first ejecting-port row 32A, a second ejecting-port row 32B and a third ejecting-pot row 32C in this order from the upper side toward the down side of the direction A in which the substrate subject to soldering is conveyed; in addition, the solder ejecting ports are arranged in such a manner that the center positions of the solder ejecting ports in each of the first ejecting-port row 32A, the second ejecting-port row 32B and the third ejecting-pot row 32C are staggered relative to the direction B perpendicular to the direction A in which the substrate P subject to soldering is conveyed and they are designed in such a manner that their bore diameters become smaller as they are positioned closer to the downstream side of the direction A in which the substrate to be soldered is conveyed.

And each wall portion 32a surrounding each of the solder ejecting ports 32 on the solder wave forming plate 31 is formed in such a manner as to be allowed to project upwardly by, for example, coining.

In accordance with this configuration, too, since each wall portion 32a surrounding each solder ejecting port 32 is projected upwardly, the molten solder introduced into the solder jet nozzle under the solder wave forming plate 31 is guided more properly by each projecting wall portion 32a surrounding each solder jet port 32, thereby the molten solder ejected from the solder ejecting port 32 can be piled up to a desired height. Thus, even if there occurs a little fluctuation in location on the pattern side of the substrate P subject to soldering or on the portions of the electronic parts subject to soldering, the molten solder touches the pattern side of the substrate P subject to soldering or the portions of the electronic parts subject to soldering satisfactorily, which enables the prevention of non-wetting, and hence the improvement in reliability of the products.

Further, in this configuration, since the section of the solder wave forming plate 31 at which solder ejecting ports 32 are formed is sloped in such a manner that it goes up toward the downstream side of the direction A in which the substrate P subject to soldering is conveyed, the molten solder ejected from the solder ejecting ports of the ejecting-port row 32C on the downstream side of the direction A in which the substrate P subject to soldering is conveyed flows down toward the upstream side of the direction A in which the substrate P subject to soldering is conveyed. However, the solder ejecting ports are arranged in such a manner that the center positions of the solder ejecting ports of each of the first ejecting-port row 32A, the second ejecting-port row 32B and the third ejecting-port row 32C are staggered relative to the direction B perpendicular to the direction A in which the substrate P subject to soldering is conveyed, moreover, the bore diameters of the solder ejecting ports 32 become smaller as they become closer to the downstream side of the direction A in which the substrate subject to soldering is conveyed; therefore there arise less cases where the piles of the molten solder ejected from the solder ejecting ports in the first ejecting-port row 32A on the upstream side and from the second ejecting-port row 32B in the intermediate are crushed by the molten solder ejected from the solder ejecting ports in the third ejecting-port row 32C on the downstream side. Furthermore, even if the substrate P subject to soldering has warps of various sizes caused therein due to the heat of the molten solder, the molten solder ejected from the solder ejecting ports 32 satisfactorily touches the pattern side of the substrate P subject to soldering and all the portions of the electronic parts subject to soldering, which enables preventing non-wetting from occurring and soldering the substrate P subject to soldering satisfactorily which has not only discrete parts, but also surface mount devices mounted thereon in a mixed state and has relatively large irregular portions on its pattern side.

Figure 1:
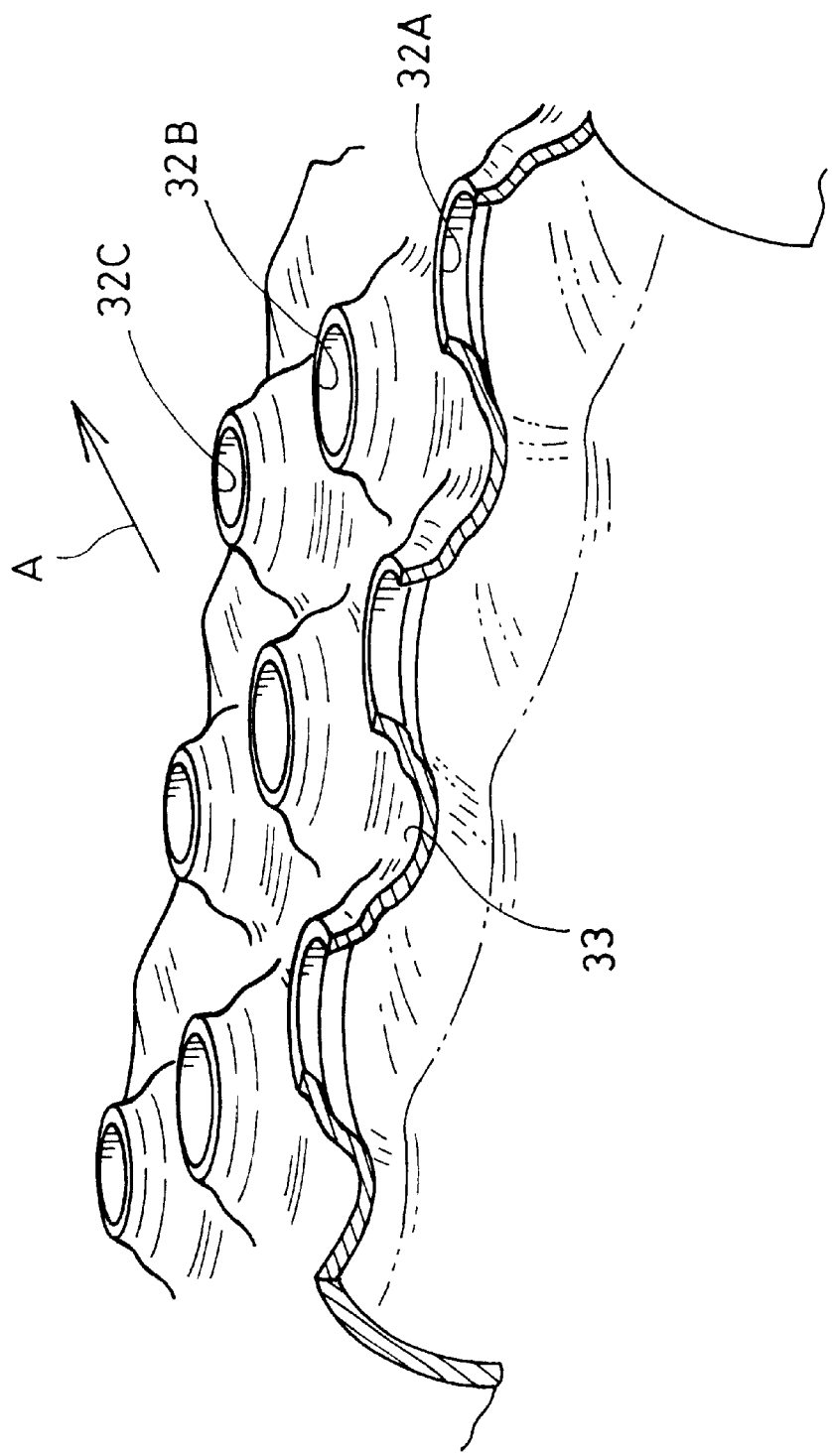
FIG. 1 is an enlarged perspective view, partly broken away, of a solder wave forming plate used in a solder jet machine of the present invention.
Figure 2A:
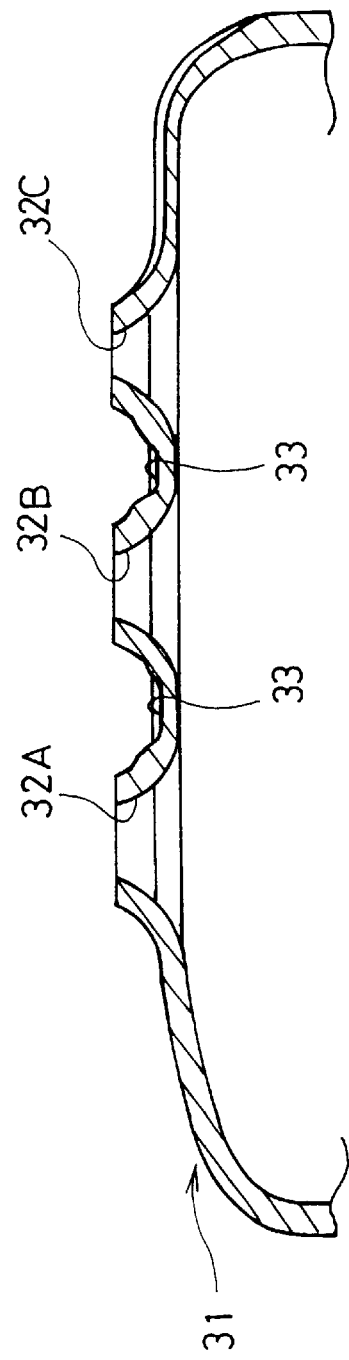
FIGS. 2*a* and 2*b* are views in section along lines I—I and II—II, respectively, of the solder wave forming plate of FIG. 1 used in a solder jet machine embodying the present invention.
Figure 2B:
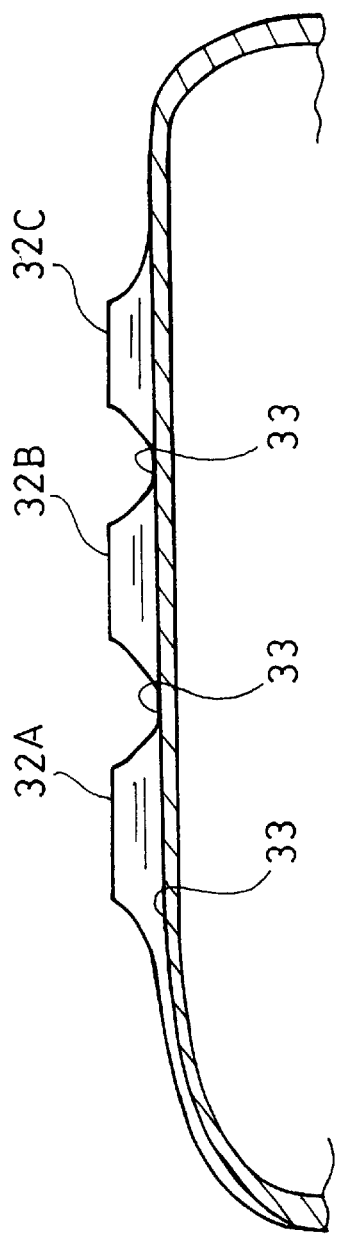
Figure 3:
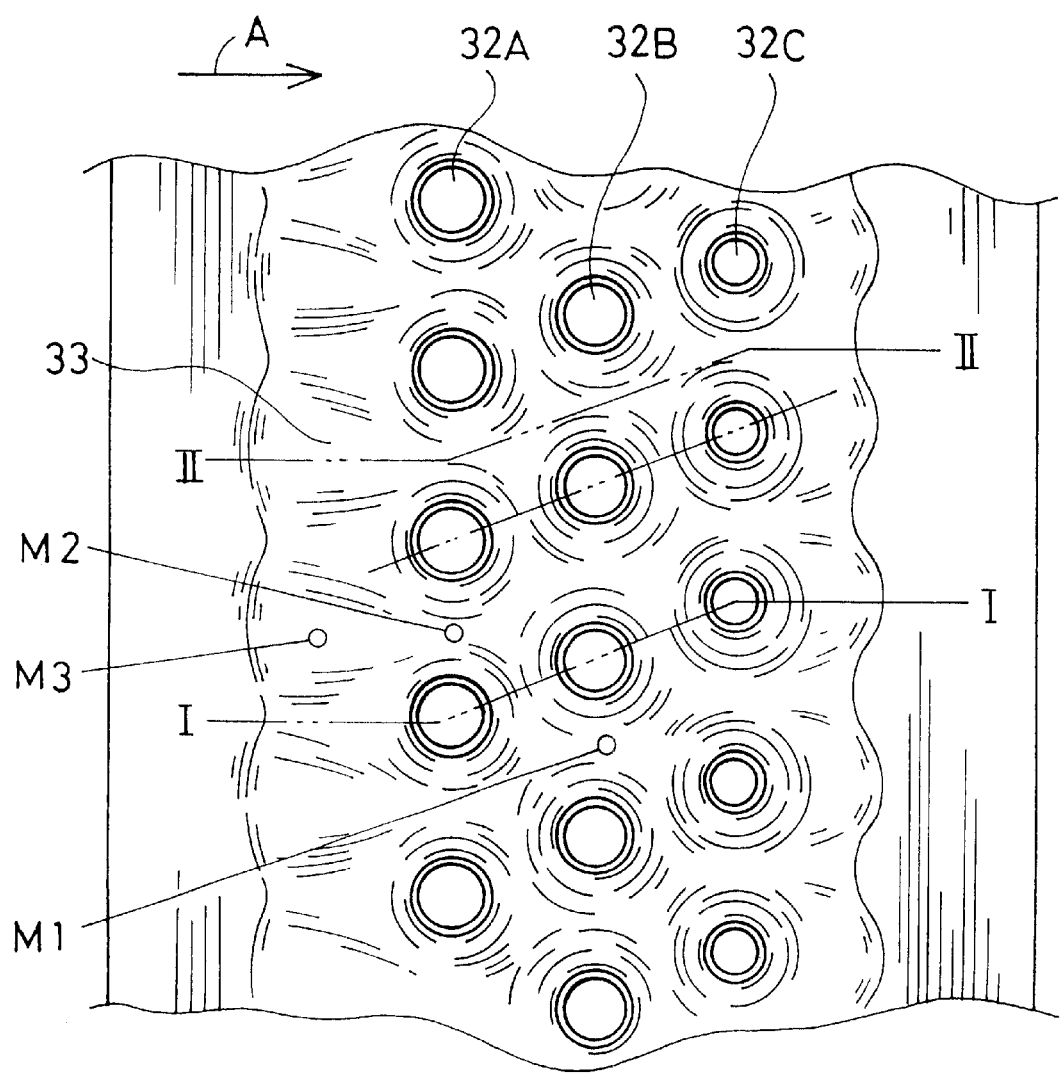
FIG. 3 is a top view of the solder wave forming plate of FIG. 1 used in a solder jet machine embodying the present invention.

Referring to FIGS. 1 to 3, there are shown the details of the second basic configuration described above.

Around each solder ejecting port of the second ejecting-port row formed is a groove portion 33 for introducing the solder ejected from the solder ejecting ports 32 in the second and the third ejecting-port rows 32B, 32C between the adjacent solder ejecting ports 32 in the first ejecting-port row 32A. FIG. 2a is a cross-sectional view of FIG. 3 taken along the line I—I and FIG. 2b is a cross-sectional view of FIG. 3 taken along the line II—II. The groove portions 33 are formed between the adjacent solder ejecting ports 32 in the second and the third ejecting-port rows 32B and 32C.

With respect to the depth of each groove portion 33, when letting M1 denote a point between the adjacent solder ejecting ports 32 in the second ejecting-port row 32B, M2 denote a point between the adjacent solder ejecting ports 32 in the first ejecting-port row 32A, and M3 denote a point on the upper side relative to the first ejecting-point row 32A (a point on the downstream side relative to the direction of the molten solder flow), as shown in FIG. 3, the groove portions 33 are formed in such a manner that their depths become larger at points M1, M2 and M3 in this order so that at least part of the molten solder ejected from the solder ejecting ports in the third ejecting-port row 32C can flow down between the adjacent solder ejecting ports 32 in the second ejecting-port row 32B and between the adjacent solder ejecting ports 32 in the first ejecting-port row 32A. In this configuration, the groove portions 33 were formed over the whole solder wave forming plate 31.

Figure 10:
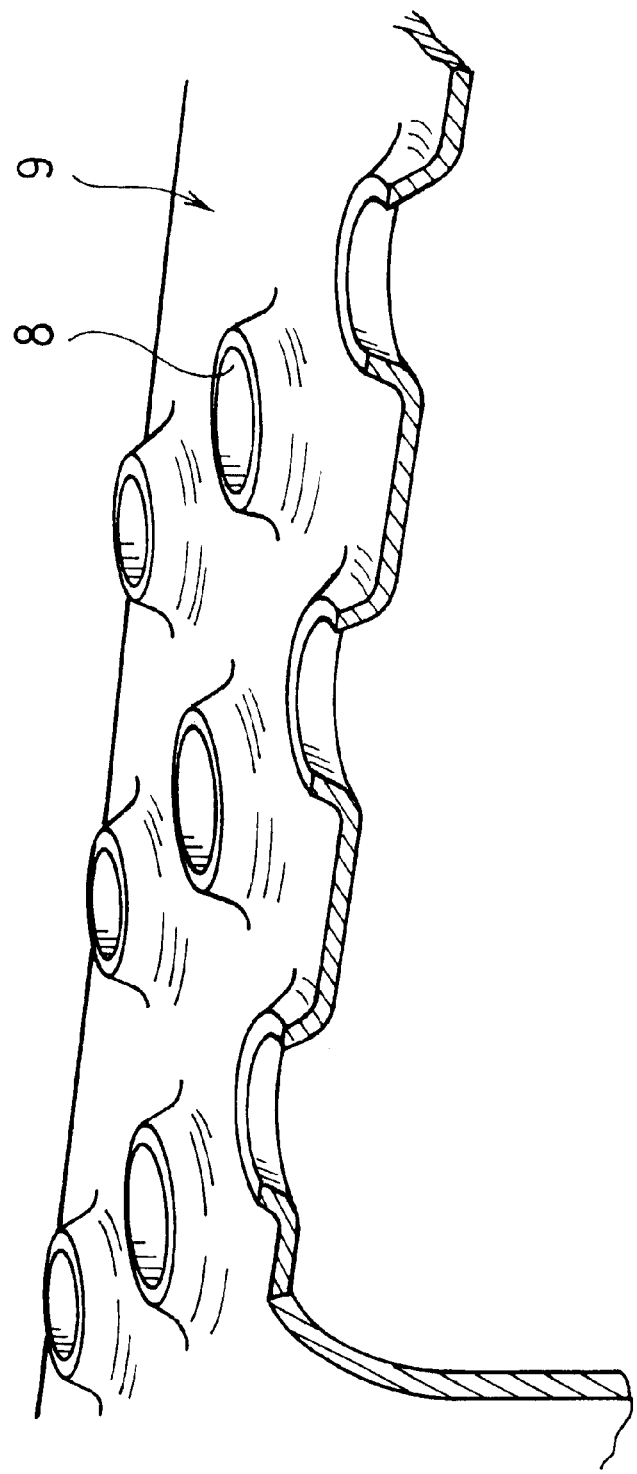
FIG. 10 is an enlarged perspective view, partially in broken away, of a solder wave forming plate, illustrating the subject of the present invention.
Figure 11:
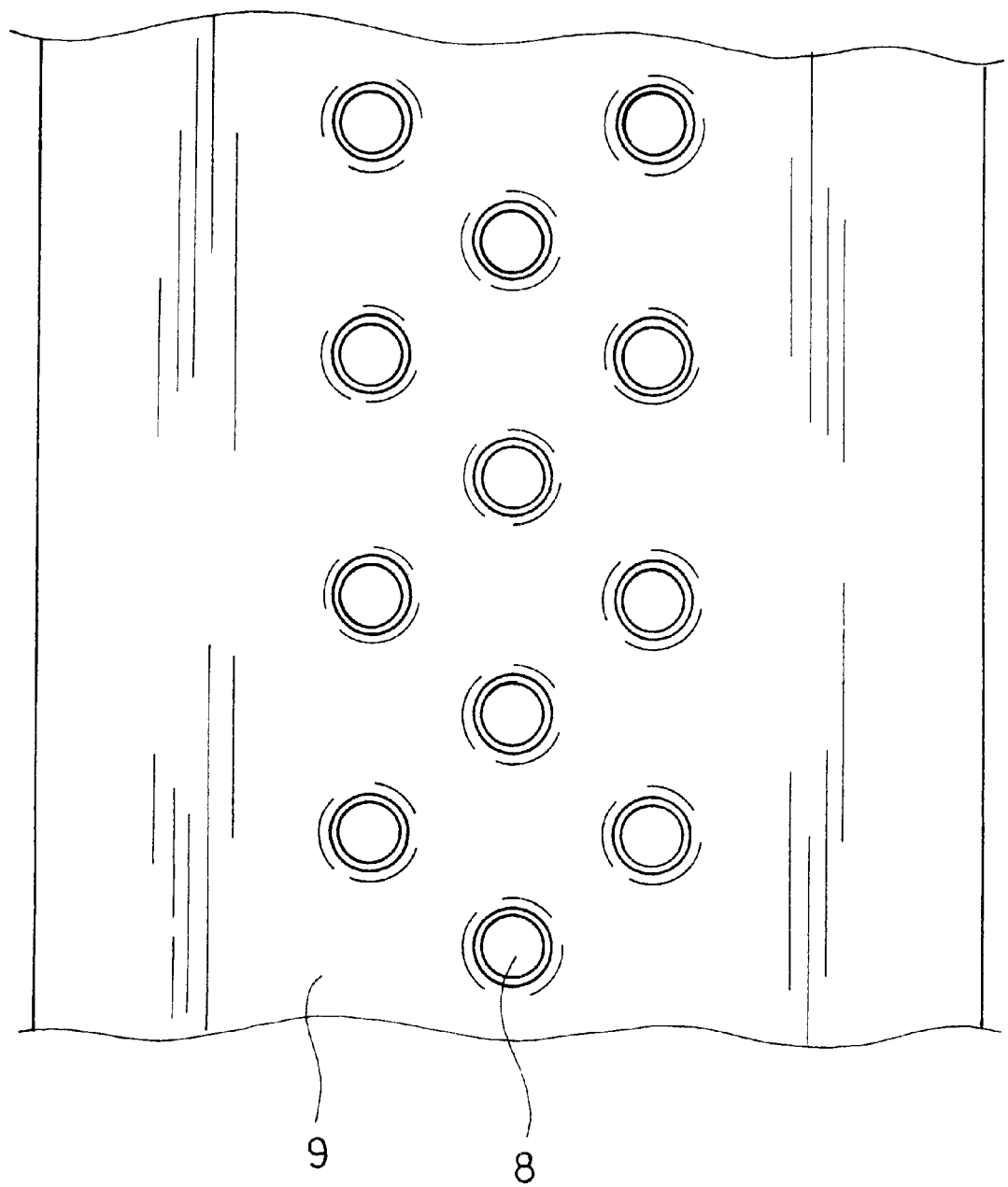
FIG. 11 is a top view of FIG. 10.

To be more concrete, when the grooves are formed on the solder wave forming plate 31 as follows:

M1=0.5 mm,
M2=1.0 mm, and
M3=1.5 mm, part of the molten solder ejected from the solder ejecting ports in the third ejecting-port row 32C and the molten solder ejected from the solder ejecting ports in the second ejecting-port row 32B flowed down rapidly from the point M1 to the point M3 via the point M2, and the molten solder ejected from the solder ejecting ports in the third ejecting-port row 32C and the second ejecting-port row 32B and flowing down on the solder wave forming plate 31 did not disturb the wave of the molten solder ejected from the solder ejecting ports in the first ejecting-port row 32A; thereby a satisfactory and stable wave was obtained and soldering defects, which were caused by the molten solder running onto the component side of the substrate P subject to soldering which was conveyed, could be prevented from occurring, unlike the cases where the surface of the solder wave forming plate 31 is uniform as shown in FIG. 10.

Figure 4:
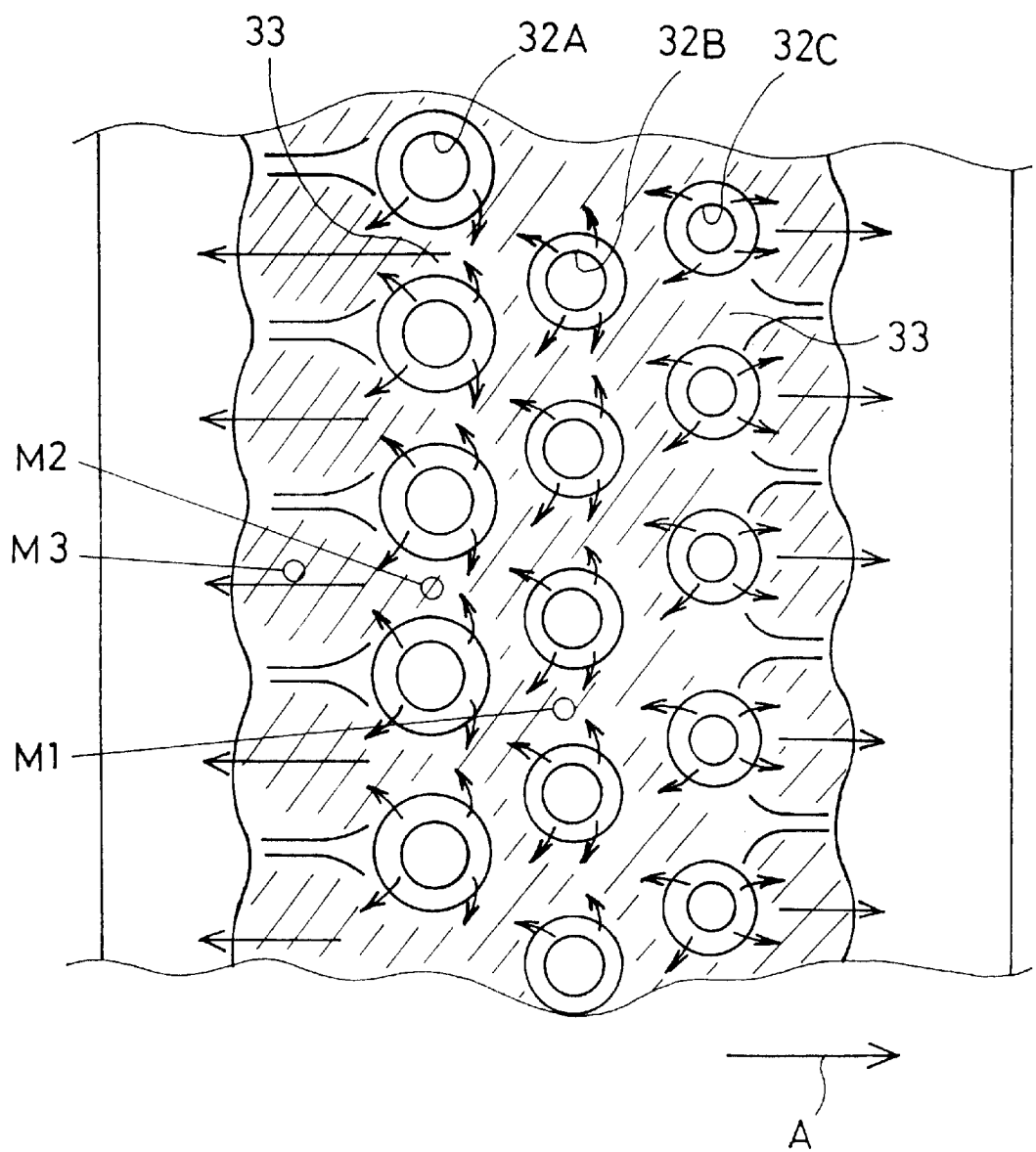
FIG. 4 is a schematic view showing the position of grooves and the flow of solder on the solder wave forming plate of FIG. 1 used in a solder jet machine embodying the present invention.

Referring now to FIG. 4, there is shown a schematic view of the locations of the groove portions described above and the flow of the solder in the groove portions. In the drawing, the groove portions are shown with hatching and the solder flow directions are shown with arrows.

The groove portions 33 are formed around the solder ejecting ports 32 in the first, the second and the third ejecting-port rows 32A, 32B and 32C, in addition, they are formed from the groove portions 33 around the solder ejecting ports 32 in the first ejecting-port row 32A toward the upstream side, on the solder wave forming plate 31, relative to the direction A in which the substrate subject to soldering is conveyed as well as from the groove portions 33 around the solder ejecting ports 32 in the third ejecting-port row 32C toward the downstream side, on the solder wave forming plate 31, relative to the direction A in which the substrate subject to soldering is conveyed, and all the groove portions 33 are linked to each other.

Forming a groove portion 33 at the point M3 allows the molten solder ejected from the solder ejecting ports 32 in the first ejecting-port row 32A to flow through the groove portion 33 at the point M3 positively.

In addition, since each of the groove portions at the points M1, M2 and M3 is formed to have a larger depth in this order, a slope is given for the molten solder's flow, and moreover, due to the grooves, the flow amount of the molten solder is increased at the groove portions 33. This effect is much more enhanced by sloping the solder wave forming plate 31 in such a manner that it goes up toward the downstream side relative to the direction A in which the substrate P subject to soldering is conveyed, as in the case of the second basic configuration.

Further, since there are formed groove portions from the groove portions around the solder ejecting ports 32 in the third ejecting-port row 32C toward the downstream side, on the solder wave forming plate 31, relative to the direction A in which the substrate subject to soldering is conveyed, part of the molten solder ejected from the solder ejecting ports 32 in the third ejecting-port row 32C flows toward the downstream side.

Although the main part of the second basic configuration has been described above, the similar effect can be also expected in the aforementioned first basic configuration by forming the groove portions 33 in the same manner as above.

Although the embodiments of the present invention have been described in terms of the cases where the wall portions 22a, 32a surrounding the solder ejecting ports 22, 32 are allowed to project upwardly by coining, it goes without saying that the wall portions 22a, 32a surrounding the solder ejecting ports 22, 32 are allowed to project by some other methods. Further, although the embodiments of the present invention have been described in terms of the cases where the solder ejecting ports 22, 33 form three rows relative to the direction A in which the substrate subject to soldering is conveyed, it is natural that the present invention is applicable to the cases where the solder ejecting ports form two rows, or four or more rows. The shape of the solder ejecting ports 22, 32 is not limited to round, the present invention is applicable when adopting various shapes such as polygon, angle and rectangle. When the aforementioned structure is provided on only part of the jet nozzle, the same effect can be obtained as far as the place provided with such a structure is concerned. As a material of the solder particularly suitable is tin/copper solder free from lead, however, the present invention is also applicable when using various types solder, such as the conventional solder containing lead and some other types solder free from lead.

Although the groove portions 33 are formed overeat entire solder wave forming plate 31 in the above-described embodiments, even if the groove portions 33 are formed on only part of the solder wave forming plate 31, for example, on only the central portion of the solder wave forming plate 31, the soldering performance is improved, compared with that of the prior art.

What is claimed is:
1. A solder jet machine for soldering substrates moving therethrough in a substrate conveyance direction from an upstream side toward a downstream side of the machine, the machine comprising:

a solder wave forming plate having multiple solder ejecting ports exiting through a top surface thereof, wherein the solder ejecting ports are located in multiple rows extending across the substrate conveyance direction, said ports are arranged so that an imaginary line linking a solder ejecting port in a row on the upstream side and a solder ejecting port in a row on the downstream side is sloped upward in the substrate conveyance direction so that molten solder ejected from a solder ejecting port on the downstream side will flow opposite the substrate conveyance direction and between adjacent solder ejecting ports on the upstream side;

wall portions surrounding each solder ejecting port projecting upwardly from the surface of the solder wave forming plate; and the solder wave forming plate comprises groove portions having a surface lower than said surface of the solder wave forming plate, said grooved portions located adjacent at least some of the solder ejecting ports for causing ejected molten solder to flow opposite the substrate conveyance direction.

2. The solder jet machine according to claim 1, wherein the solder ejecting ports comprise a first ejecting-port row, a second ejecting-port row and a third ejecting-port row located on the solder wave forming plate in three rows arranged from the upstream side toward the downstream side;

the solder wave forming plate is for flowing at least part of molten solder ejected from the solder ejecting ports in the third ejecting-port row opposite the substrate conveyance direction between the adjacent solder ejecting ports in the second ejecting-port row and between the adjacent solder ejecting ports in the first ejecting-port row; and the solder ejecting ports in the second ejecting-port row have groove portions formed around them for directing molten solder ejected from the solder ejecting ports in the second and the third ejecting-port rows along a route between the adjacent solder ejecting ports in the first ejecting-port row.

3. The solder jet machine according to claim 1, wherein the solder ejecting ports comprise a first ejecting-port roy, a second ejecting-port row and a third ejecting-port row located in three rows arranged from the upstream side toward the downstream side;

the solder ejecting ports in the first, the second and the third ejecting-port rows have groove portions around them; and the groove portions are linked to each other for conveyance of molten solder in a direction opposite the substrate conveyance direction.

4. A method for soldering substrates moving in a substrate conveyance direction from an upstream side toward a downstream side of a solder jet machine, the method comprising:

providing at least one substrate to a solder jet machine, said machine comprising:

a solder wave forming plate having multiple solder ejecting ports exiting through a top surface thereof, wherein the solder ejecting ports include surrounding wall portions and are in multiple rows extending across the substrate conveyance direction;

the wall portions project upwardly from the surface of the solder wave forming plate; and an imaginary line linking a solder ejecting port in a row on the upstream side and a solder ejecting port in a row on the downstream side is sloped upward in the substrate conveyance direction so that molten solder ejected from solder ejecting ports on the downstream side will flow opposite the substrate conveyance direction via groove portions in the surface of the solder wave forming plate, said groove portions located around at least part of the solder ejecting ports and between adjacent solder ejecting ports on the upstream side;

conveying a substrate over the solder wave forming plate in the substrate conveyance direction; and flowing molten solder ejected from the solder ejecting ports in the direction opposite the substrate conveyance direction via the groove portions for soldering a substrate.

* * * * *